(12) United States Patent
Hayes et al.

(10) Patent No.: US 6,533,363 B1
(45) Date of Patent: Mar. 18, 2003

(54) GREASE RETAINER FOR VEHICLE WHEEL HUBS

(75) Inventors: Brian D. Hayes, Newark, OH (US); Tomaz Dopico Varela, Gahanna, OH (US)

(73) Assignee: Meritor Heavy Vehicle Technology, LLC, Troy, MI (US)

( * ) Notice: Subject to any disclaimer, the term of this patent is extended or adjusted under 35 U.S.C. 154(b) by 0 days.

(21) Appl. No.: 10/085,591

(22) Filed: Feb. 26, 2002

(51) Int. Cl.[7] .......................... B60B 27/00; F16C 33/66
(52) U.S. Cl. ................ 301/105.1; 29/898.07; 384/462; 184/5.1
(58) Field of Search ................ 301/105.1, 124.1, 301/126, 131; 29/898.04, 898.07, 898.09, 898.1, 898.061, 898.062; 384/462, 544, 551, 589; 184/5.1

(56) References Cited

U.S. PATENT DOCUMENTS

| 4,655,617 | A |   | 4/1987  | Yasui et al. |
| 4,732,398 | A |   | 3/1988  | Biss |
| 4,824,264 | A |   | 4/1989  | Hoebel |
| 5,022,659 | A |   | 6/1991  | Otto |
| 5,320,433 | A |   | 6/1994  | Kimata et al. |
| 5,757,084 | A | * | 5/1998  | Wagner .................... 301/105.1 |
| 5,803,616 | A |   | 9/1998  | Persson et al. |
| 5,816,711 | A |   | 10/1998 | Gingrich |
| 5,875,550 | A | * | 3/1999  | Kohn ...................... 29/898.07 |
| 5,904,427 | A | * | 5/1999  | Braun et al. ................. 384/472 |
| 5,992,943 | A | * | 11/1999 | Sheets et al. ........ 301/105.1 X |
| 5,997,103 | A | * | 12/1999 | Wagner .................... 301/105.1 |
| 6,149,244 | A | * | 11/2000 | Wagner .................... 301/105.1 |
| 6,199,662 | B1|   | 3/2001  | Felk |
| 6,200,037 | B1| * | 3/2001  | Braun et al. ................. 384/466 |
| 6,321,875 | B1|   | 11/2001 | Mihalak |

* cited by examiner

Primary Examiner—Russell D. Stormer
(74) Attorney, Agent, or Firm—Carlson, Gaskey & Olds

(57) ABSTRACT

A wheel hub assembly includes a first bearing assembly, a wheel hub, a grease retainer, and a second bearing assembly mounted on a spindle. The grease retainer extends between and in engagement with the first bearing cup, and the second bearing cup. The grease retainer is formed of a resilient material, to maintain the retainer against the bearing cups such that the required grease fill is reduced and prevents grease from escaping the bearing assemblies.

21 Claims, 2 Drawing Sheets

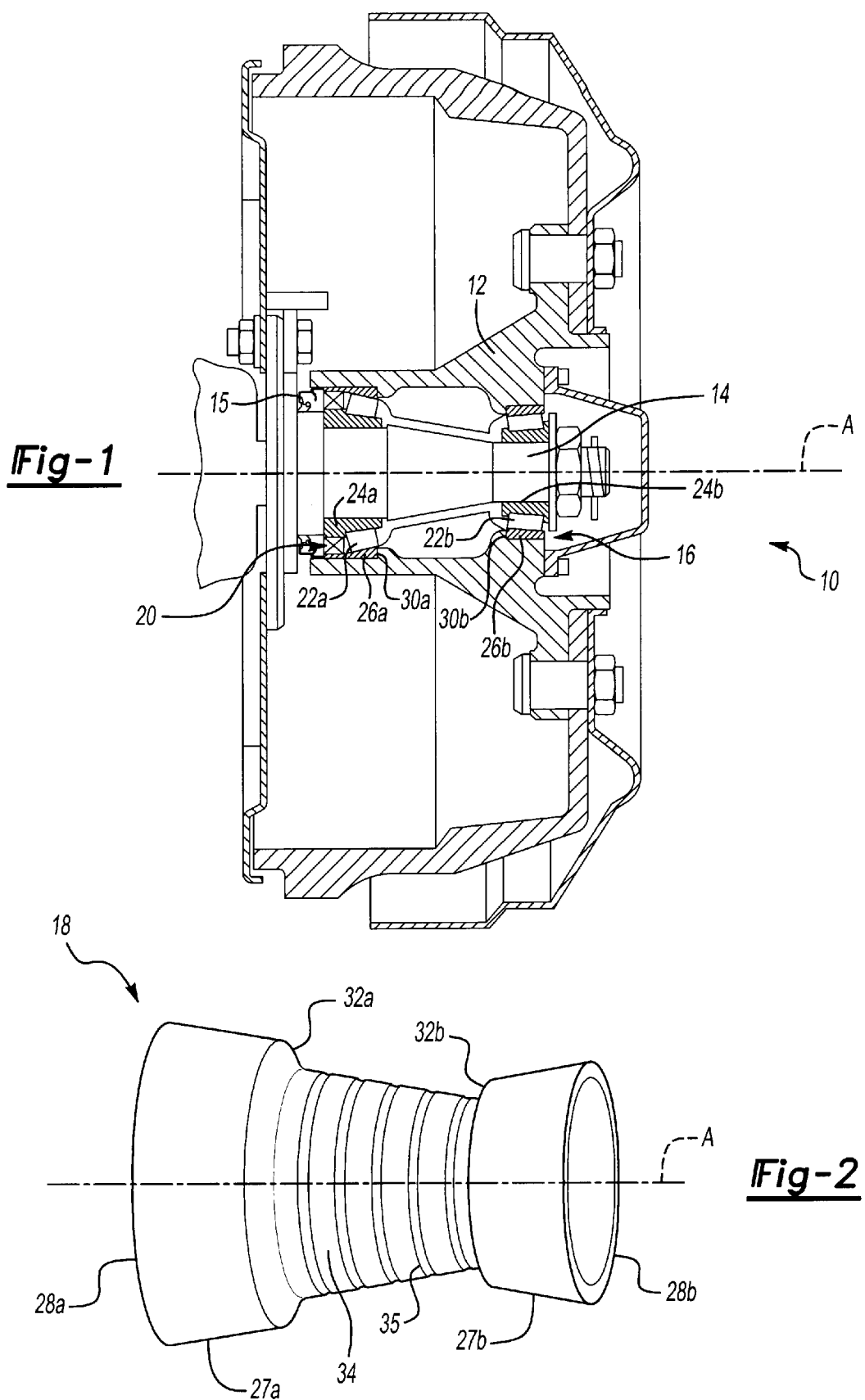

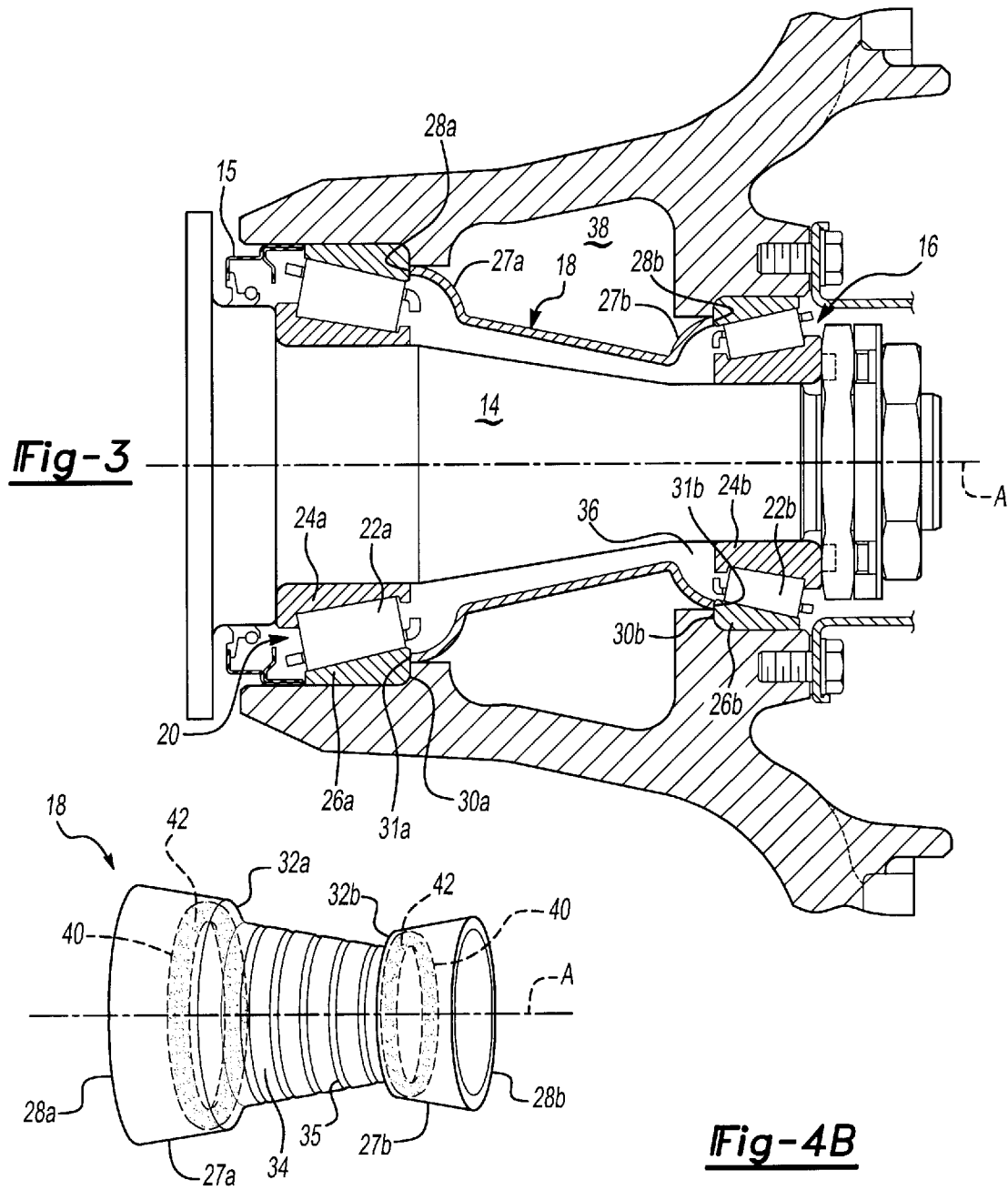
*Fig-3*
*Fig-4A*
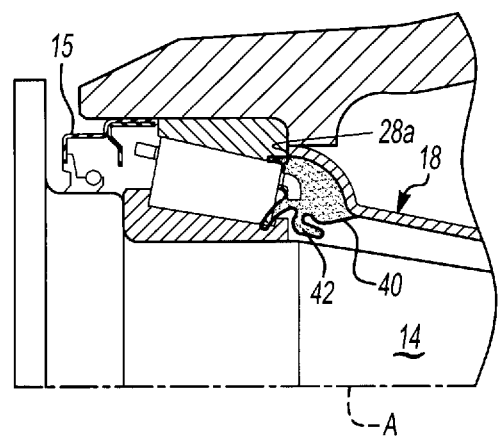
*Fig-4B*

GREASE RETAINER FOR VEHICLE WHEEL HUBS

BACKGROUND OF THE INVENTION

The present invention relates to wheel hub assemblies, and more particularly to a grease retainer which provides for a reduced grease fill.

Wheel bearings have three central components, the rollers, bearing cone, and the bearing cup. The rollers are contained between the bearing cone and the bearing cup. The cone rests against a shaft spindle and the cup rests against the wheel hub. Grease retainers are typically installed such that the end portions are pressed between the wheel hub and bearing cups. The wheel hubs must be machined on the surface below the bearing cups to provide a proper mating surface for the grease retainer.

Known grease retainers require multiple components. Typically, a grease retainer is required for each bearing. Each grease retainer has an end portion and a side portion extending from the end portion. The end portion is pressed between the bearing cup and the wheel hub. The side portions of the retainers extend away from the bearing to form an area next to the bearings which is filled with grease. A similar retainer is installed for the second bearing. Disadvantageously, a gap may be formed between the retainers which may allow grease to pass into a cavity within the wheel hub. Although the grease retainers slow the movement of grease away from the bearings the retainers may not completely prevent such movement. To compensate for the gradual loss of grease, a rather large fill is typically provided.

Moreover, mounting the bearing cups upon the grease retainer may result in shifting of the bearings. A precise machine operation is therefore required to assure a proper mating surface for the grease retainer. This machining process requires additional time and expense.

Accordingly, it is desirable to provide a retainer which provides for a lower grease fill and the minimization of wheel hub machining.

SUMMARY OF THE INVENTION

A hub assembly according to the present invention includes a wheel hub mounted on a spindle. The hub assembly is assembled such that a grease retainer is installed in the hub, followed by a first bearing and a seal. The hub is then installed on the spindle, followed by a second bearing. Each wheel bearing has rollers, a bearing cone, and a bearing cup. The grease retainer is of a single piece which allows for a lower grease fill in the area adjacent the bearings. Installation of the retainer abutting the bearing cups eliminates machining of the wheel hubs otherwise required by other retainer designs.

The grease retainer extends between and is in engagement with the first and second bearing cups. The grease retainer is manufactured of a resilient material and has a generally cylindrical shape. A center portion of the grease retainer is generally parallel to its end portions. The center portion is radially offset from the end portions to reduce the required grease fill and prevent leakage of the grease past the retainer. The grease may be retained in the grease retainer prior to installation by a thin synthetic film that will rupture upon installation.

The present invention therefore provides a grease retainer which reduces the grease fill and minimizes machining of the wheel hubs.

BRIEF DESCRIPTION OF THE DRAWINGS

The present invention for a grease retainer will be described by way of example only through the following illustrations:

FIG. 1 is a partial sectional view of the wheel hub according to the present invention;

FIG. 2 is a perspective view of a grease retainer, prior to installation;

FIG. 3 is an expanded cross-sectional view of the grease retainer installed in the wheel hub assembly;

FIG. 4A is a cross-sectional view of the grease retainer showing the pre-packaged grease; and FIG. 4B is a cross-sectional view of the grease retainer with the prepackaged grease installed in the wheel hub assembly.

DETAILED DESCRIPTION OF THE PREFERRED EMBODIMENT

As shown in FIG. 1 a wheel hub assembly 10 includes a wheel hub 12, rotatably mounted on a spindle 14 which defines an axis A. Supporting the hub 12 upon the spindle 14 are a first bearing 16 and a second bearing 20. A grease retainer 18 is preferably located between the bearings. Each wheel bearing 16, 20 includes a bearing cone 24a, 24b, with integral rollers 22a, 22b and a bearing cup 26a, 26b. Each bearing cone 24 is adjacent the spindle 14 and each bearing cup 26 is located adjacent the wheel hub 12. The grease retainer is held in position by compressing the retainer between the first and second bearing cups 26a, 26b. Preferably, the grease retainer is axially compressed. A seal 15 may be mounted between the wheel hub 12 and the spindle 14 to prevent injection of contaminants or the like.

Referring to FIG. 2, the grease retainer 18 is of a generally cylindrical shape. The grease retainer 18 includes end portions 27a, 27b having terminal ends 28a, 28b. Shoulders 32a and 32b are defined between the end portions 27a, 27b and a center portion 34. The center portion 34 is generally parallel to the end portions 27a, 27b which define a larger diameter relative to the center portion 34. That is, the shoulders 32a, 32b radially extend away from the center portion 34 to define the larger diameter end portions 27a, 27b.

A plurality of ridges 35 are provided on the center portion 34 of the retainer 18. The ridges 35 are preferably radially formed about the center portion 34. The ridges 35 reinforce the grease retainer 18 by increasing the stiffness and the axial flexibility thereof.

Referring to FIG. 3, the grease retainer 18 extends between and engages the first bearing cup 26a, and the second bearing cup 26b. Axial end portions 27a, 27b of the retainer, including terminal ends 28a, 28b, are positioned against the first cup 26a and the second cup 26b, respectively. The grease retainer 18 is preferably manufactured of a resilient material, such as an elastomer. The retainer 18 is axially compressed between the bearing cups 26a, 26b with ridges 35 allowing axial compression in addition to that provided by the elastomeric material. The retainer 18 is thereby biased against both bearing cups 26a, 26b.

Spaced apart hub shoulders 30a, 30b are defined by the hub 12 such that when the first and second cups 26a and 26b are installed, the cups 26a, 26b radially extend beyond the hub shoulders 30a and 30b. That is, the cups 26a, 26b define a smaller diameter than the hub shoulders 30a, 30b relative the axis A. A radially extending engagement surface 31a, 31b is thereby provided by the cups 26a, 26b. The grease retainer 18 is installed such that terminal ends 28a, 28b thereof abut the radially extending engagement surfaces 31a, 31b.

The center portion 34 of the retainer between the end portions 27a, 27b, reduces the required grease fill. The center portion 34 also prevents grease from leaking past the retainer 18. By extending between the shoulder portions 32a, 32b the center portion 34 obstructs the escape of grease flow from the bearings.

The grease retainer 18 defines two enclosed cavities 36, 38. The spindle 14, bearing cups 26a and 26b, and retainer 18, form the first cavity 36. First cavity 36 is filled at least partially with grease. Second cavity 38 is not filled with grease. The second cavity 38 is located adjacent the hub 12 and retainer 18. The total amount of grease fill is thereby greatly reduced by the grease retainer 18.

The wheel hub assembly 10 is assembled such that the bearing cups 26a, 26b are installed in the hub 12 followed by the grease retainer 18, which snaps in place due to its resilient nature. Grease is then applied to the inside of the retainer near end portions 27a, 27b. The inner bearing cone assembly 24a with internal roller 22a are located against its respective cup 26a. Preferably, the inner bearing cone assembly 24 is pre-packed with grease. The seal 15 is then mounted in the hub 12. The hub 12 is then installed on the spindle 14 such that the seal 15 extends between the hub 12 and the spindle 14. At this time additional grease may be added to the cavity 36, if desired, and the outer bearing cone 24b with internal roller 22b are then installed. Assembly is completed by the adjustment and retention of the bearings by any number of commonly available spindle nuts, washers, and the like.

Referring to FIG. 4A, the grease may be alternatively or additionally prepackaged within the interior of the grease retainer 18 prior to installation. A generally thin synthetic film 40 is used to retain the grease 42 inside the grease retainer 18 to provide a pre-packaged grease filled grease retainer.

The grease 42 is retained in each end portion 27a, 27b of the grease retainer 18. The grease 42 is packaged within the film 40 to form a generally annular arrangement such that the grease retainer 18 will pass over the spindle 14 without release of the grease 42. The synthetic film 40 is then ruptured upon installation (FIG. 4B) of the grease retainer 18 to release the grease 42 into cavity 36 (FIG. 3). The film 40 essentially dissolves during later operation.

The invention has been described in an illustrative manner, and it is to be understood that the terminology that has been used is intended to be in the nature of words of description rather than of limitation. Obviously, modifications and variations of the present invention are possible in light of the above teachings. It is, therefore, to be understood that within the scope of the appended claims the invention may be practiced otherwise than as specifically described.

What is claimed is:

1. A wheel bearing assembly for a vehicle comprising;

a spindle;

a wheel hub mounted on said spindle;

first and second bearing assemblies supporting said wheel hub on said spindle, said first and second bearing assemblies respectively including first and second bearing cups supported on said wheel hub; and a grease retainer which extends between and in engagement with said first and second cups.

2. The assembly according to claim 1, wherein said grease retainer comprises opposing end potions in abutting relationship with said cups.

3. The assembly according to claim 2, wherein said grease retainer is compressed between said bearing cups.

4. The assembly according to claim 2, wherein said wheel hub comprises spaced apart shoulders which locate said cups, said cups having a radially extending engagement surface which extends beyond said shoulders.

5. The assembly according to claim 4, wherein said grease retainer end portions engage said radially extending engagement surfaces.

6. The assembly according to claim 5, wherein said end portions are perpendicular to said radially extending engagement surfaces.

7. The assembly according to claim 1, wherein said grease retainer defines an enclosed cavity between said bearings adjacent said wheel hub.

8. The assembly according to claim 1, wherein said retainer is generally cylindrical.

9. The retainer according to claim 8, wherein said retainer comprises side portions interconnected by a center portion, said side portions extending at an angle relative to end portions.

10. The retainer according to claim 9, wherein said center portion is generally parallel to said end portions.

11. The retainer according to claim 9, further comprises ridges arranged about said center portion.

12. The retainer according to claim 11, wherein said ridges are radially arranged about said center portion.

13. The retainer according to claim 1, wherein said retainer is manufactured of an elastomeric material.

14. The retainer according to claim 1, further comprising a generally thin synthetic film retaining grease within said grease retainer.

15. The retainer according to claim 14, wherein said synthetic film forms an annular arrangement.

16. The retainer according to claim 14, wherein said synthetic film is retained within an end portion of said grease retainer.

17. A method of assembling a hub assembly comprising of the steps of;

a) installing a first and second bearing cup onto a hub;

b) mounting a grease retainer onto the hub following said step a) such that the grease retainer engages the first and second bearing cups.

18. A method as described in claim 17, further comprises the steps of;

1. positioning a first bearing cone against the first bearing cup;

2. mounting the hub on a spindle;

3. positioning a second bearing cone against the second bearing cup.

19. A method as described in claim 17, said step b) further comprises axially compressing said grease retainer.

20. A method as described in claim 17, further comprises the step of filling a cavity defined by the grease retainer with a grease.

21. A method as described in claim 17, further comprises the steps of releasing a grease from within the film during rupturing a film adjacent the grease retainer during said step b).

* * * * *

UNITED STATES PATENT AND TRADEMARK OFFICE
CERTIFICATE OF CORRECTION

PATENT NO.    : 6,533,363 B1
DATED         : March 18, 2003
INVENTOR(S)   : Hayes et al.

It is certified that error appears in the above-identified patent and that said Letters Patent is hereby corrected as shown below:

Column 4,
Lines 28, 48, 58 and 61, "comprises" should be -- comprising --.

Signed and Sealed this

Tenth Day of June, 2003

JAMES E. ROGAN
*Director of the United States Patent and Trademark Office*